US008943239B2

(12) United States Patent
Shen et al.

(10) Patent No.: US 8,943,239 B2
(45) Date of Patent: Jan. 27, 2015

(54) DATA SNOOPING DIRECT MEMORY ACCESS FOR PATTERN DETECTION

(75) Inventors: Jian Shen, San Diego, CA (US); Jing Li, Saratoga, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/562,076

(22) Filed: Jul. 30, 2012

(65) Prior Publication Data

US 2014/0032793 A1 Jan. 30, 2014

(51) Int. Cl.
*G06F 13/28* (2006.01)

(52) U.S. Cl.
USPC ............................. 710/26; 714/720; 714/766

(58) Field of Classification Search
None
See application file for complete search history.

(56) References Cited

U.S. PATENT DOCUMENTS

| | | | | |
|---|---|---|---|---|
| 5,933,594 A | * | 8/1999 | La Joie et al. | 714/26 |
| 6,735,636 B1 | | 5/2004 | Mokryn et al. | |
| 6,971,058 B2 | * | 11/2005 | Evans et al. | 714/807 |
| 6,985,441 B1 | | 1/2006 | Acharya | |
| 7,877,401 B1 | * | 1/2011 | Hostetter et al. | 707/758 |
| 7,934,025 B2 | | 4/2011 | Sapp et al. | |
| 8,036,346 B2 | * | 10/2011 | Taylor | 379/88.18 |
| 8,365,277 B2 | * | 1/2013 | Kim et al. | 726/22 |
| 2002/0073228 A1 | | 6/2002 | Cognet et al. | |
| 2003/0023920 A1 | * | 1/2003 | Jeong et al. | 714/755 |
| 2005/0111446 A1 | | 5/2005 | Greaves et al. | |
| 2006/0184961 A1 | * | 8/2006 | Lee et al. | 725/32 |
| 2007/0098163 A1 | * | 5/2007 | Macri et al. | 380/203 |
| 2007/0104327 A1 | * | 5/2007 | Macri et al. | 380/203 |
| 2011/0102446 A1 | * | 5/2011 | Oterhals et al. | 345/545 |
| 2013/0024875 A1 | * | 1/2013 | Wang et al. | 719/318 |

OTHER PUBLICATIONS

Udayakumar H, "Verification of Data Integrity Using CRC", Copyright © 2012, Texas Instruments Incorporated. Application Report, SPNA146—Feb. 2012.
International Search Report and Written Opinion—PCT/US2013/052548—ISA/EPO—Dec. 16, 2013.
Knuth, D.E., "The Art of Computer Programming, 2nd edition", Mar. 1998, Addison Wesley Longman, Reading, MA, USA, XP007919497, ISBN: 0201896850 vol. 3, pp. 513-558, [retrieved on Mar. 1, 1998] p. 513.

* cited by examiner

*Primary Examiner* — Elias Mamo
(74) *Attorney, Agent, or Firm* — Howard Seo

(57) ABSTRACT

A direct memory access controller for efficiently detecting a character string within memory, the direct memory access controller generating signatures of character strings stored within the memory and comparing the generated signatures with the signature of the character string for which detection is desired.

24 Claims, 5 Drawing Sheets

DATA SNOOPING DIRECT MEMORY ACCESS FOR PATTERN DETECTION

FIELD OF DISCLOSURE

The present invention relates to pattern detection, and more particularly to pattern detection of character strings stored in a memory.

BACKGROUND

There are many instances in which it is desirable to detect a data pattern within a set of data. The data is stored in memory, such as system memory in a computer system, where the data pattern is a string of characters. Such instances of data pattern detection arise in search and replacement of strings in word processing applications, null character detection in a character string, locating a macro block within a pixel image frame for computer vision applications, and facial recognition based on various metrics, to name just a few examples.

Typically, a central processing unit is used to load characters from memory into various registers and then compare the characters one by one with the character string for which pattern detection is to be performed. This process slows down the central processing unit and the system memory.

SUMMARY

Embodiments of the invention are directed to systems and methods for detecting a pattern in data (characters) stored in electronic memory.

In an embodiment, a signature representing the pattern, and a memory address pointing to the characters to be examined, are stored in a register file. The embodiment includes control logic to load characters into a first-in-first-out (FIFO) buffer. The first character loaded has a first address equal to the memory address stored in the register file. The control logic loads a first character string from the FIFO buffer into a compression engine, and the compression engine generates a first signature corresponding to the first character string. A comparator compares the first signature with the stored signature. If the first signature does not match the signature stored in the register file, then the control logic loads a second character string from the FIFO buffer into the compression engine.

In an embodiment, the control logic generates an interrupt signal if the first signature matches the signature stored in the register file.

In an embodiment, the compression engine generates a second signature from the second character string if the first signature does not match the signature stored in the register file.

In an embodiment, the control logic loads a second address associated with the second character string into the register file provided the comparator indicates that the second signature matches the signature stored in the first register.

It will be apparent to one of ordinary skill in the art upon reading the detailed description below that the above-described characteristics of some of the embodiments may be combined in various ways to realize devices to repeatedly shift character strings from the FIFO buffer into a compression engine to generate signatures from the character strings, where these generated signatures are compared to the signature stored in the register file. The memory addresses for the beginning of the character strings are kept track by storing them in the register file. A successful comparison of a generated signature with the signature stored in the register file may indicate that the pattern represented by the signature is present in the characters that have been loaded into the compression engine. As discussed later, for some embodiments the event of a generated signature matching the signature stored in the register file may not always indicate with complete certainty that the pattern represented by the signature is present, but a match may be indicative of the pattern being present with a very high probability.

It will also be apparent to one of ordinary skill in the art that an embodiment may be realized as a method. For example, in an embodiment, a method includes loading a memory address into a register file of a direct memory access (DMA) controller, and loading the signature into the register file of the DMA controller. Characters from system memory are loaded into a first-in-first-out (FIFO) buffer starting from the memory address. A first signature of a first character string stored in the FIFO buffer is generated, and is compared with the signature of the character string stored in the register file of the DMA controller. Provided the first signature does not match the signature of the character string stored in the register file of the DMA controller, a second signature of a second character string stored in the FIFO buffer is generated.

In an embodiment method, a second memory address associated with the second character string is loaded into the register file provided the second signature matches the signature stored in the register file.

In an embodiment method, an interrupt signal is generated provided the first signature matches the signature stored in the register file.

It will also be apparent to one of ordinary skill in the art that the above-described characteristics of some of the embodiments may be implemented by a processor executing instructions stored in computer memory, where the computer memory may be part of the same memory hierarchy in which the data (characters) are stored.

For example, in an embodiment, the stored instructions cause a DMA controller to execute a process to load characters from the memory into a FIFO buffer starting from a memory address stored in a register file in the DMA controller. The process includes generating a first signature of a first character string stored in the FIFO buffer; comparing the first signature with a signature of the character string stored in the register file of the DMA controller; and provided the first signature does not match the signature of the character string stored in the register file of the DMA controller, generating a second signature of a second character string stored in the FIFO buffer.

The process executed by the processor may further include loading a second memory address associated with the second character string into the register file provided the second signature matches the signature stored in the register file. The process may further include generating an interrupt signal provided the first signature matches the signature stored in the register file.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
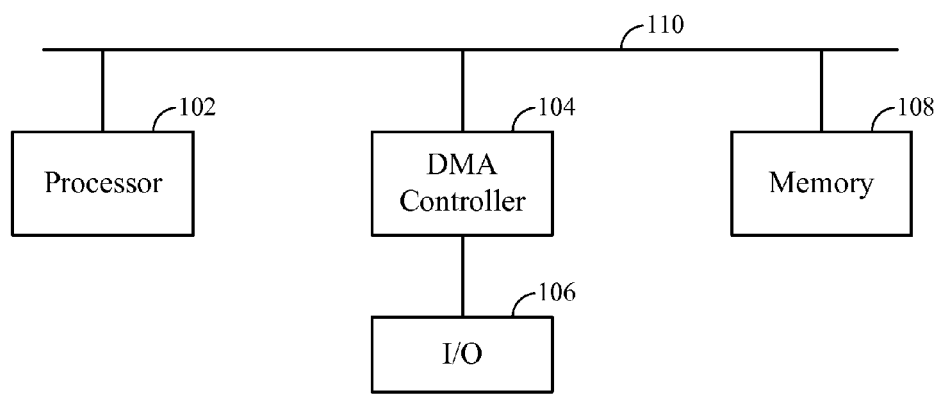
FIG. 1 illustrates a high level abstraction of a system according to an embodiment, where the system may be a computer system.

Embodiments of the invention are disclosed in the following description and related drawings. Alternate embodiments may be devised without departing from the scope of the invention. Additionally, well-known elements of the embodiments will not be described in detail or will be omitted so as not to obscure the relevant details of the embodiments. The term "embodiments of the invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and "including", when used herein, specify the presence of stated features, integers, steps, operations, elements, and components, but do not preclude the presence or addition of one or more other features, integers, steps, operations, elements, components, and groups thereof.

Further, many embodiments are described in terms of sequences of actions to be performed by, for example, elements of a computing device. Specific circuits (e.g., application specific integrated circuits (ASICs)), program instructions being executed by one or more processors, or a combination of both, may perform the various actions described herein. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments are directed to detecting whether or not some desired string of characters, which may be termed a pattern, is present in system memory. Rather than working directly with the character string under consideration, embodiments work with the signature of the character string. Signatures of character strings stored in system memory are compared with the signature associated with the character string. If there is a match of signatures, then a match of character strings may be declared.

The term "character" in these letters patent is to be interpreted broadly, and will denote a unit of information. A "string of characters" or a "character string" is to be interpreted broadly, and will denote a set of characters. For example, a character may be a pixel in a block of pixels, where a string of such characters is the block of pixels.

FIG. 1 illustrates a high level abstraction of a system according to an embodiment, where the system may be a computer system, a tablet computer, or a smart phone, to name just a few examples. For simplicity, only several system components are illustrated in FIG. 1, including Processor 102, DMA (Direct Memory Access) Controller 104, I/O (Input-Output) Peripheral Component 106, Memory 108, and System Bus 110. Memory 108 represents a memory hierarchy, which may include a memory controller, system RAM (Random Access Memory), and other levels of memory. I/O Peripheral Component 106 represents one or more drivers for sending or receiving data signals from peripheral components.

Figure 2:
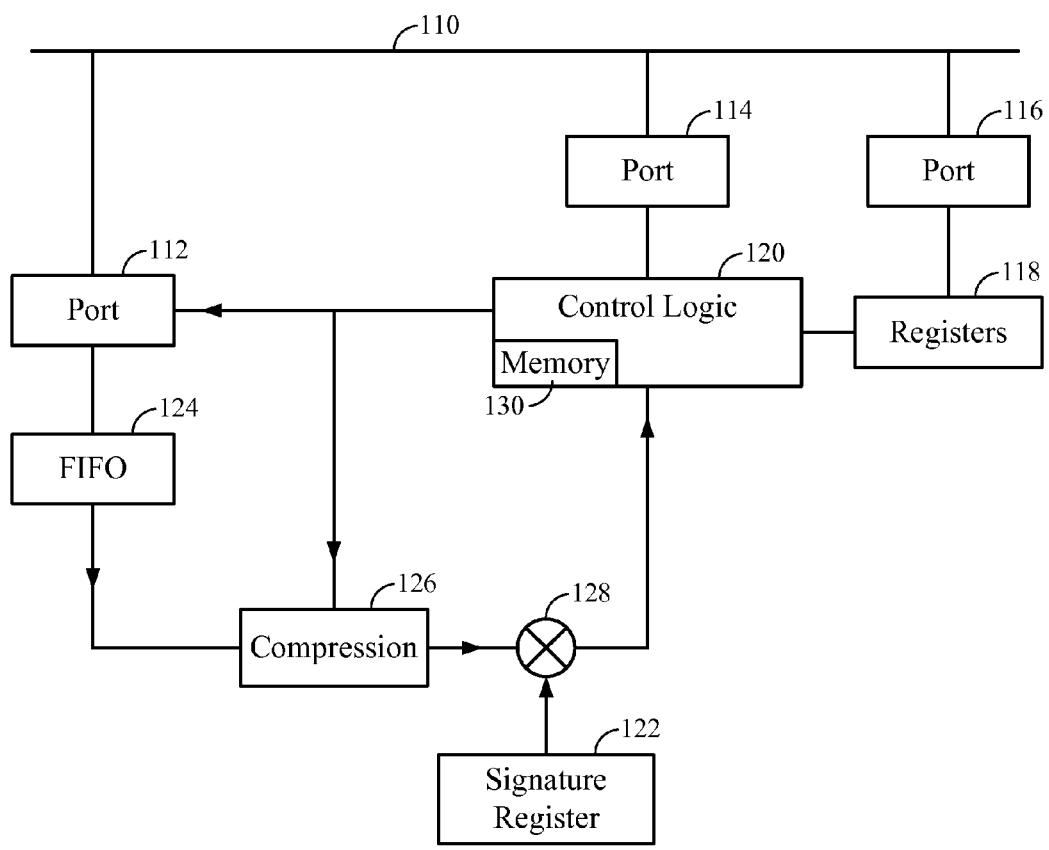
FIG. 2 illustrates a high level abstraction of the direct memory access controller in the embodiment of FIG. 1.

DMA Controller 104 is a system component to manage the transfer of data between two addressable locations within the system memory address space and to verify memory operations, and it may operate as a bus master. In particular, DMA Controller 104 may read data from one addressable location and detect the existence of patterns in the data. DMA Controller 104 is a finite state automaton comprising internal registers and memory for programming by Processor 102. DMA Controller 104 may be put into a program state so that Processor 102 may initialize and load instructions into its internal registers FIG. 2 illustrates a high level abstraction of DMA Controller 104. Various components illustrated in FIG. 2 couple to System Bus 110 by way of Port 112, Port 114, and Port 116. Although Port 112, Port 114, and Port 116 are shown as separate components, a single port circuit coupled to System Bus 110 may provide all or some of their functionality. Registers 118 is a register file. For some embodiments, this register file includes configuration registers and working registers, where the configuration registers are visible to Processor 102. Processor 102 may access the configuration registers to load various instructions, set initial values, load source and destination memory addresses, or read various data related to the state of DMA Controller 104.

Control Logic 120 controls various components illustrated in FIG. 2 according to instructions and data stored in Registers 118. According to an embodiment, Processor 102 loads one or more instructions into Registers 118 to cause Control Logic 120 to search within some defined memory region of Memory 108 for some defined string of characters. For some embodiments, a character may be one byte in length. Processor 102 may delineate the defined memory region by loading a source address and a block length into Registers 118. Here, the block length refers to the number of characters searched for pattern matching.

Embodiments use a signature to represent a string of characters. A signature is stored in a register labeled as Signature Register 122 in FIG. 2. Signature Register 122 is illustrated in FIG. 2 as a register distinct from the registers stored within Registers 118. This distinction is made only for convenience in illustrating the components of DMA Controller 104. For some embodiments, Signature Register 122 may be a register in the set of registers represented by Registers 118.

A signature representing a string of characters may sometimes be referred to as a fingerprint. A signature may be obtained by applying a hash function to a string of characters. A signature is a string of characters, or value, having a length less than that of the string of characters that generated the signature. For some embodiments, no two distinct strings of characters may have the same signature. However, for some embodiments, two or more distinct strings of characters may have the same signature. It is expected that embodiments would be designed so that two or more distinct strings of characters having the same signature is an event with very small probability.

Under control of Control logic 120, a string of characters from Memory 108 is loaded into a FIFO (First-In-First-Out) buffer, denoted as FIFO 124, and the component labeled Compression 126 applies the hash function to the string of characters stored in FIFO 124 to generate a signature. The component labeled 128 in FIG. 2 is a comparator to compare the signature generated by Compression 126 with the signature stored in Signature Register 122. Component 128 may be referred to as Comparator 128.

The result provided by Comparator 128 is provided to Control Logic 120. If this result indicates a match of the signature generated by Compression 126 with the signature stored in Signature Register 122, then Control Logic 120 may provide an interrupt signal to Processor 102 by asserting an appropriate line on System Bus 110. For some embodiments, rather than providing an interrupt signal to Processor 102, Control Logic 120 may load a value (set a flag) in one of the registers within Registers 118 to indicate a match of signatures. Processor 102 may poll this register at a later time to determine whether the defined string of characters represented by the signature stored in Signature Register 122 has been found in Memory 108.

Control Logic 120 keeps track of the memory address location of the beginning of the string of characters loaded into Compression 126. When there is a match of signatures, this address may be made available to Processor 102 by storing it in a register within Registers 118.

Control Logic 120, Compression 126, and Comparator 128 may be realized in various ways. A programmable circuit within DMA Controller 104 may implement the functionality of Control Logic 120, where the program code is stored in on-chip memory represented by component Memory 130. The programmable circuit could also be used to implement Compression 126 and Comparator 128. The program code can be stored as firmware in non-volatile memory, or it could be loaded from non-volatile memory into volatile memory during boot up of the system represented in FIG. 1. For other embodiments, special-purpose dedicated circuits could be used to implement Control Logic 120, as well as Compression 126 and Comparator 128.

Implementing the hash function of Compression 126 is well known to those of ordinary skill in the art of computer science. For example, a linear feedback shift register performing polynomial division may implement the hash function where the divisor is an irreducible polynomial over GF(2). Any such well-known technique may be used in an embodiment.

For some embodiments, Processor 102 may generate the signature for which a match is desired; or, Processor 102 may provide to DMA Controller 104 the string of characters for which a match is desired, where the DMA Controller 104 generates the associated signature The components illustrated in FIG. 2 may be viewed as a single channel. For some embodiments, DMA Controller 104 may comprise multiple channels, where each channel may operate independently, with each channel having its own set of registers, FIFO buffer, and control logic.

For the single channel illustrated in FIG. 2, Control Logic 120 shifts the contents in FIFO 124 by one character, so that Compression 126 may operate on a new character string. This is repeated a number of times so that a block of characters may be searched for a pattern associated with the signature stored in Signature Register 122.

Figure 3:
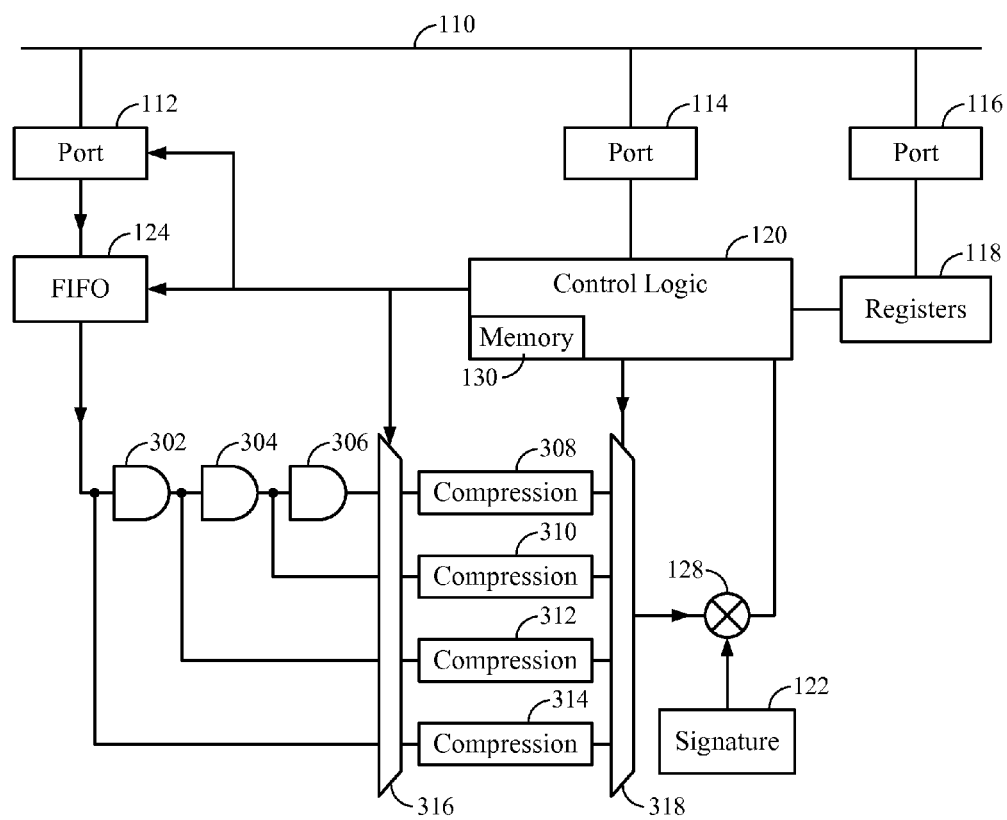
FIG. 3 illustrates another embodiment at a high level of abstraction comprising a channel within a direct memory access controller implementing parallel processing.

A single channel may implement parallel processing to implement the above-described process. FIG. 3 illustrates another embodiment at a high level of abstraction comprising a channel within DMA Controller 104 implementing parallel processing. Delay Elements 302, 304, and 306 form a tapped delay line. For some embodiments, a delay element may shift out one byte at a time, so that in the particular example represented in FIG. 3, the values in the tapped delay together form a 4-byte string.

Four compression functional units are illustrated in the particular embodiment of FIG. 3, and are labeled 308, 310, 312, and 314. Control Logic 120 controls Multiplexer 316 to provide the character string stored in the tapped delay line to each of the compression functional units. This is done in such a way as to facilitate parallel processing.

For example, when characters provided by FIFO 124 are first loaded into the tapped delay line, Control Logic 120 configures Multiplexer 316 to provide the entire content of the tapped delay line to Compression 308. When the next character from FIFO 124 enters the tapped delay line, Control Logic 120 configures Multiplexer 316 to provide the content of the tapped delay line to Compression 310. This process continues, so that each time a new character from FIFO 124 is loaded into the tapped delay line, Control Logic 120 configures Multiplexer 316 to provide the content of the tapped delay line to the next compression functional unit. When the content of the tapped delay has been provided to Compression 314, Compression 308 has finished calculating the signature for its character string. The other compression functional units are still working on their respective character strings.

Control Logic 120 configures Multiplexer 318 so that the signature generated by Compression 308 is provided to Comparator 128. When the next character from FIFO 124 is provided to the tapped delay line, Compression 308 is ready to receive the content of the tapped delay line. This procedure continues, so that each of the compression functional units provides its computed signature in round-robin fashion to Comparator 128. When any one of the compression functional units is providing its signature to Comparator 128, the other three compression functional units are working on their respective character strings. It is straightforward to modify the example illustrated in FIG. 3 to utilize more than four compression functional units to achieve a higher level of parallel processing.

Note that because of the character strings are shifted into the tapped delay line one character at a time, the various character strings analyzed for the pattern of interest have characters in common, so that various character strings have overlapping memory locations.

Figure 4:
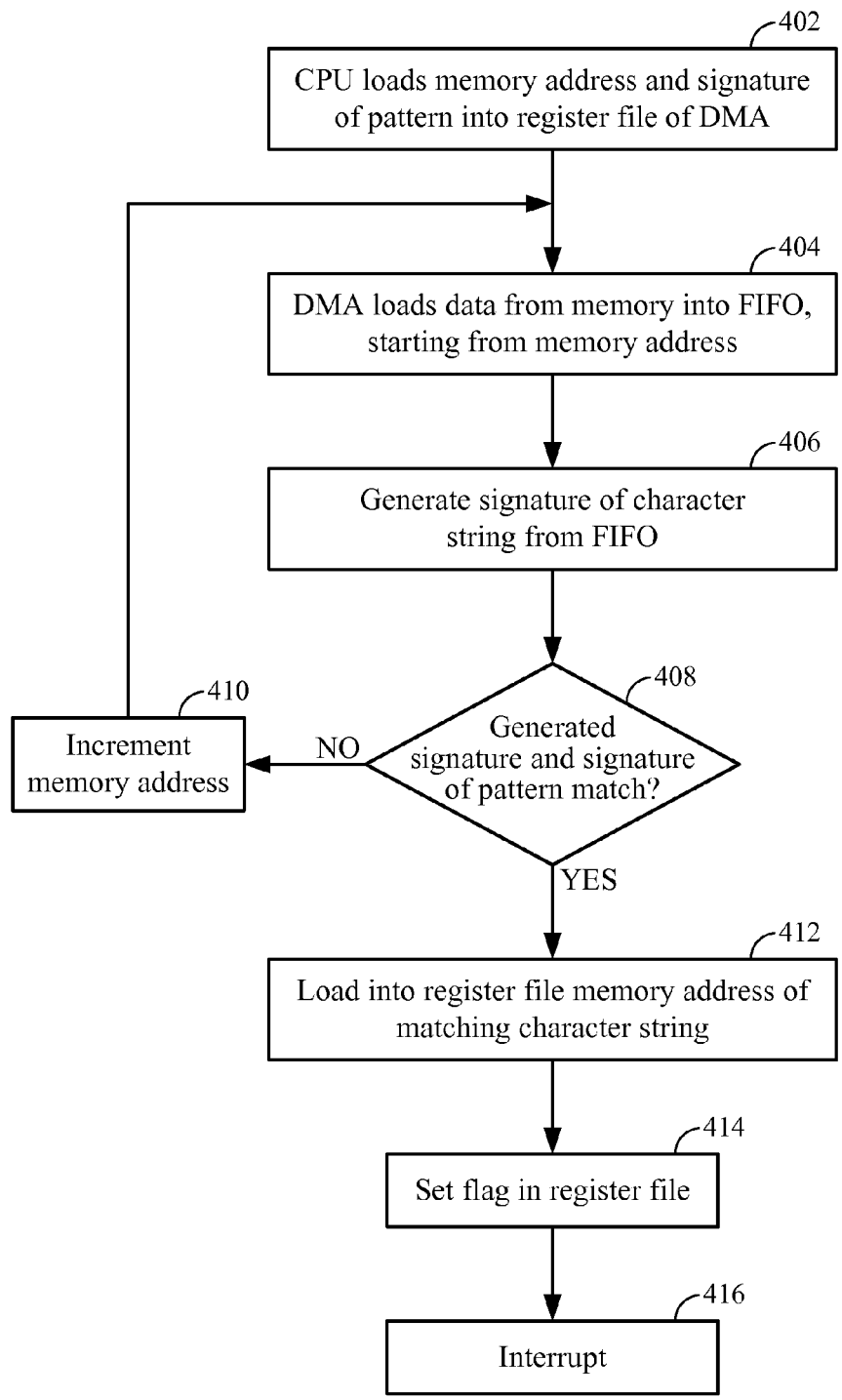
FIG. 4 illustrates a method according to an embodiment, which may be implemented by instructions stored in memory and executed by a processor.

FIG. 4 illustrates a method according to an embodiment, which may be implemented by instructions stored in Memory 108 and Memory 130, and executed by Processor 102 and Control Logic 120. Referring to block 402 in FIG. 4, a central processing unit (CPU), such as Processor 102, loads a memory address and a signature of a character string (the pattern of interest) into the register file of the DMA controller. In block 404, the DMA controller loads data from memory into a FIFO buffer, where the data starts at the memory address that was stored in the register file. In block 406, a character string from the FIFO buffer is loaded into a compression engine so that a signature is generated. In block 408, the generated signature is compared with the signature of the character string that the CPU loaded into the register file. If there is no match, the memory address stored in the register file is incremented to correspond with the memory address of the next character string that will be moved from the FIFO buffer (block 410). For some embodiments, the memory address may be incremented each time a character is loaded from memory into the FIFO buffer. Control is brought back to block 404.

If, however, the generated signature matches the signature of the character string of interest, then control is brought to block 412 where the memory address of the matching character string is loaded into the register file of the DMA controller. For some embodiments, as discussed above, the memory address may be incremented each time data is loaded into the FIFO buffer, so that the memory address of the current character string is already present in the register file of the DMA controller. For some embodiments, a flag may be set in the register file of the DMA controller to indicate that there is a signature match (block 414). As described previously, in some embodiments Processor 102 may poll the register file of the DMA controller to determine whether a flag has been set to indicate a signature match. Some embodiments may assert a line in System Bus 110 to interrupt Processor 102, as indicated in block 416.

Figure 5:
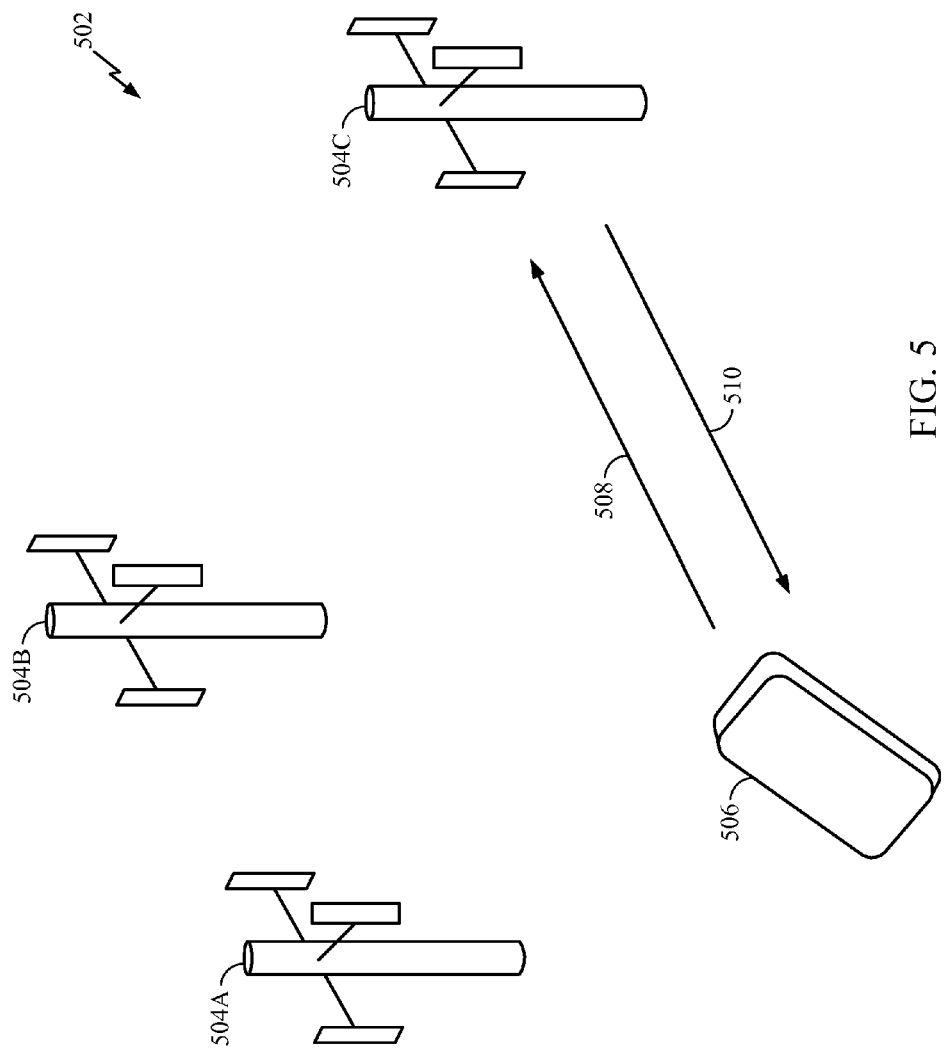
FIG. 5 illustrates a cellular phone network in which the disclosed embodiments may find application.

Embodiments may find widespread application in numerous systems, such as a cellular phone network. For example, FIG. 5 illustrates cellular phone network 502 comprising Base Stations 504A, 504B, and 504C. FIG. 5 shows a communication device, labeled 506, which may be a mobile cellular communication device such as a so-called smart phone, a tablet, or some other kind of communication device suitable for a cellular phone network. Communication Device 506 need not be mobile. In the particular example of FIG. 5, Communication Device 506 is located within the cell associated with Base Station 504C. Arrows 508 and 510 pictorially represent the uplink channel and the downlink channel, respectively, by which Communication Device 506 communicates with Base Station 504C.

Embodiments may be used in data processing systems associated with Communication Device 506, or with Base Station 504C, or both, for example. FIG. 5 illustrates only one application among many in which the embodiments described herein may be employed.

Various modifications may be made to the disclosed embodiments without departing from the scope of the invention as claimed at the end of this specification. For example, some embodiments may be realized by processing systems that do not utilize a shared system bus, but where various components and peripherals communicate by way of a switch topology. For such embodiments, the descriptions for the previous embodiments are still applicable, but where communication technology other than a system bus may be used.

As another example of a modification to the above-described embodiments, once a signature match is obtained, an embodiment may further compare the character string retrieved from memory with the character string that generated the signature for which comparisons were made against. This may be desirable if absolute precision is needed, because as discussed previously, for some embodiments two different character strings may have the same associated signature, although such events most likely will be very unlikely for practical embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for detecting a pattern in memory as described in the above documents. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus comprising:
a register file comprising a first register to store a signature and a second register to store a memory address;
a first-in-first-out (FIFO) buffer having an output;
control logic to load characters into the FIFO buffer where the first character loaded into the FIFO buffer has a first address equal to the memory address stored in the second register;
a tapped delay line coupled to the output of the FIFO buffer, the tapped delay line comprising one or more delay elements having respective one or more delayed outputs;
a multiplexer coupled to the control logic to multiplex the output of the FIFO buffer and said one or more delayed outputs from the tapped delay line;
a plurality of compression engines coupled to the multiplexer, the control logic to load a first character string from the FIFO buffer into the compression engines, the compression engines to generate a first signature corresponding to the first character string;
a comparator to compare the first signature with the signature stored in the first register;
wherein the control logic loads a second character string from the FIFO buffer into the compression engines provided the comparator indicates that the first signature does not match the signature stored in the first register.

2. The apparatus as set forth in claim 1, the second character string having a first character having a second address, the compression engines to generate a second signature corresponding to the second character string.

3. The apparatus as set forth in claim 2, wherein the comparator is further configured to compare the second signature with the signature stored in the first register, and wherein the control logic is further configured to load the second address into the register file provided the comparator indicates that the second signature matches the signature stored in the first register.

4. The apparatus as set forth in claim 1, further comprising:
a memory to store the characters loaded into the FIFO buffer, the first and second character strings having overlapping memory locations in the memory.

5. The apparatus as set forth in claim 1, further comprising:
a memory to store the characters loaded into the FIFO buffer, the first and second character strings having no shared memory locations in the memory.

6. The apparatus as set forth in claim 1, the control logic to generate an interrupt signal provided the first signature matches the signature stored in the first register.

7. The apparatus as set forth in claim 1, further comprising:
a processor to load the memory address into the first register.

8. The apparatus as set forth in claim 7, the control logic to provide an interrupt signal to the processor provided the first signature matches the signature stored in the first register.

9. The apparatus as set forth in claim 1, further comprising:
a processor to load the signature into the second register.

10. The apparatus as set forth in claim 1, the second character string having a first character having a second address, the compression engines to generate a second signature corresponding to the second character string, the apparatus further comprising:
a bus;
a memory to store the characters, the memory coupled to the bus;
the comparator to compare the second signature with the signature stored in the first register;
the control logic to load the second address into the register file provided the comparator indicates that the second signature matches the signature stored in the first register;
a processor coupled to the bus to store the memory address into the first register, and to read the second address stored in the register file provided the comparator indicates that the second signature matches the signature stored in the first register.

11. An apparatus comprising:
means for storing a signature and a memory address;
means for buffering characters where the first buffered character has a first address equal to the memory address to generate a buffered output;
means for tap delaying the buffered output to generate one or more tap delayed outputs;
means for multiplexing the buffered output and said one or more tap delayed outputs;
means for generating signatures from character strings, to generate a first signature from a first character string stored in the means for buffering characters through the means for multiplexing;
means for comparing, to compare the first signature with the signature;
wherein the means for generating the signatures from the character strings generates a second signature of a second character string buffered in the means for buffering characters provided the means for comparing indicates that the first signature does not match the signature.

12. The apparatus as set forth in claim 11, further comprising:
means for generating an interrupt signal provided the first signature matches the signature.

13. The apparatus as set forth in claim 11, further comprising:
a bus;
a memory to store the characters, the memory coupled to the bus, the means for buffering characters coupled to the bus to read the buffered characters from the memory;
a processor coupled to the bus to load a first memory address into the means for storing the signature and the memory address.

14. The apparatus as set forth in claim 13, wherein the first memory address equals the memory address.

15. The apparatus as set forth in claim 13, the processor coupled to the bus to load the signature into the means for storing the signature and the memory address.

16. A method comprising:
loading a memory address into a register file of a direct memory access (DMA) controller;
loading a signature of a character string into the register file of the DMA controller;
loading characters from a memory into a first-in-first-out (FIFO) buffer starting from the memory address;
generating a buffered output from the FIFO buffer;
tap delaying the buffered output to generate one or more tap delayed outputs;
multiplexing the buffered output and said one or more tap delayed outputs in a multiplexer;
generating a first signature of a first character string stored in the FIFO buffer through the multiplexer;
comparing the first signature with the signature of the character string stored in the register file of the DMA controller;
provided the first signature does not match the signature of the character string stored in the register file of the DMA controller, generating a second signature of a second character string stored in the FIFO buffer.

17. The method as set forth in claim 16, the second character string associated with a second memory address, the method further comprising:
comparing the second signature with the signature stored in the register file;
loading the second memory address into the register file provided the second signature matches the signature stored in the register file.

18. The method as set forth in claim 16, the first and the second character strings having overlapping memory locations in the memory.

19. The method as set forth in claim 16, the first and the second character strings having no shared memory locations in the memory.

20. The method as set forth in claim 16, further comprising:
generating an interrupt signal provided the first signature matches the signature stored in the register file.

21. An apparatus comprising a memory having stored instructions, the stored instructions causing a direct memory access (DMA) controller to execute a process comprising:

loading characters from the memory into a first-in-first-out (FIFO) buffer starting from a memory address stored in a register file in the DMA controller;
generating a buffered output from the FIFO buffer;
tap delaying the buffered output to generate one or more tap delayed outputs;
multiplexing the buffered output and said one or more tap delayed outputs in a multiplexer;
generating a first signature of a first character string stored in the FIFO buffer through the multiplexer;
comparing the first signature with a signature of the character string stored in the register file of the DMA controller;
provided the first signature does not match the signature of the character string stored in the register file of the DMA controller, generating a second signature of a second character string stored in the FIFO buffer.

22. The apparatus as set forth in claim 21, the second character string associated with a second memory address, the process further comprising:
comparing the second signature with the signature stored in the register file;
loading the second memory address into the register file provided the second signature matches the signature stored in the register file.

23. The apparatus as set forth in claim 21, further comprising:
generating an interrupt signal provided the first signature matches the signature stored in the register file.

24. A communication system comprising:
a register file comprising a first register to store a signature and a second register to store a memory address;
a first-in-first-out (FIFO) buffer having an output;
control logic to load characters into the FIFO buffer where the first character loaded into the FIFO buffer has a first address equal to the memory address stored in the second register;
a tapped delay line coupled to the output of the FIFO buffer, the tapped delay line comprising one or more delay elements having respective one or more delayed outputs;
a multiplexer coupled to the control logic to multiplex the output of the FIFO buffer and said one or more delayed outputs from the tapped delay line;
a plurality of compression engines coupled to the multiplexer, the control logic to load a first character string from the FIFO buffer into the compression engines, the compression engines to generate a first signature corresponding to the first character string;
a comparator to compare the first signature with the signature stored in the first register;
wherein the control logic loads a second character string from the FIFO buffer into the compression engines provided the comparator indicates that the first signature does not match the signature stored in the first register;
wherein the communication system is selected from the group consisting of a cellular mobile communication device and a cellular base station.

* * * * *